July 15, 1952 H. C. NOE Re. 23,521

NEEDLE BAR ASSEMBLY FOR WARP KNITTING MACHINES

Original Filed July 19, 1947

INVENTOR.
Harold C. Noe
BY
J. William Carem
ATTORNEY

Reissued July 15, 1952 Re. 23,521

UNITED STATES PATENT OFFICE 23,521

NEEDLE BAR ASSEMBLY FOR WARP KNITTING MACHINES

Harold C. Noe, Upper Montclair, N. J., assignor to Kidde Manufacturing Co., Inc., Bloomfield, N. J., a corporation of Delaware Original No. 2,562,939, dated August 7, 1951, Serial No. 762,017, July 19, 1947. Application for reissue October 9, 1951, Serial No. 250,408

2 Claims. (Cl. 66—114)

Matter enclosed in heavy brackets [ ] appears in the original patent but forms no part of this reissue specification; matter printed in italics indicates the additions made by reissue.

The present invention relates to knitting machines, and more particularly to the needle assembly of warp knitting machines.

The present invention is concerned with knitting machines having a needle bar on which are secured a plurality of needle blocks supporting the needles.

One of the difficulties heretofore encountered with machines of this type was that the bolts or screws utilized to secure the blocks to the bar retained the blocks against slight shifting primarily by friction. During the knitting operation, when the needles were subjected to severe forces which in turn were transmitted to the blocks, the resulting force acting thereon tended to overcome the force of friction holding the blocks in position on the bar. Due to the fact that the blocks were formed of some relatively soft material, such as lead, shifting thereof caused the bolts or screws to enlarge the holes in the blocks through which they extended, thus eventually permitting the blocks to be shifted a sufficient distance to place the needles out of alignment. This necessitated frequent shut down of the machine and the tedious operation of readjusting the blocks to align the needles.

The present invention aims to overcome the foregoing difficulties and disadvantages by providing a needle assembly which is simple in construction, economical to manufacture, and reliable in operation.

Accordingly, an object of the present invention is to provide means for mounting the needle blocks in a predetermined position with respect to the needle bar to thereby align the needles in a simple expedient manner.

Another object is to lock the needle blocks in position to prevent shifting thereof when subjected to severe forces during operation of the machine.

Another object is to facilitate assembling the needle blocks on the needle bar.

A further object consists of the arrangement of parts and the construction of elements whereby the foregoing objects are accomplished.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
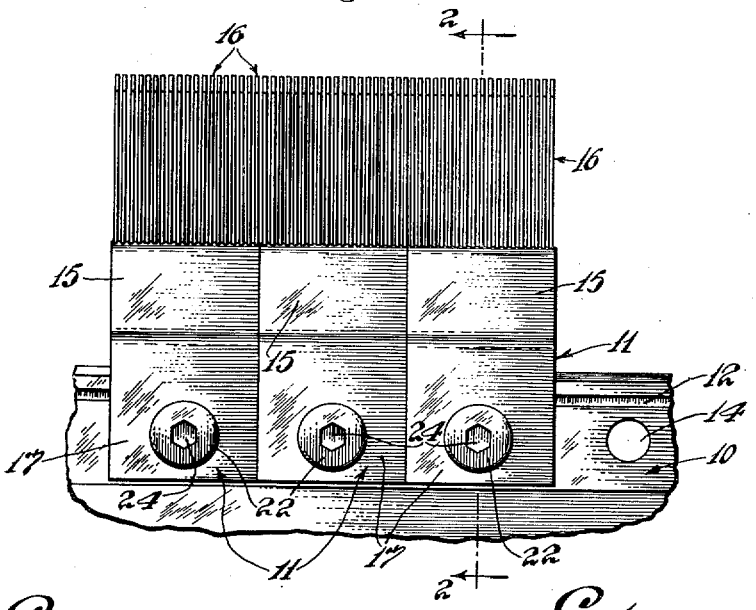
Figure 1 is a fragmentary front elevational view of a needle bar and needle blocks, one block being removed, illustrating the present invention.

Referring to the drawing in detail, there is shown, in Figure 1, a portion of a needle bar 10 which may be associated with a warp knitting machine or the like, and a plurality of needle blocks 11 mounted side by side on the bar 10. The bar may be of any desired length depending upon the width of the warp and any desired number of blocks may be utilized, three blocks being shown by way of example to illustrate the present invention.

The needle bar 10 has a lengthwise extending groove or recess 12 formed therein just below the upper edge thereof and has a plurality of spaced threaded apertures 14 each adapted for receiving means for securing one of the needle blocks 11 as will be described hereinafter.

Figure 2:
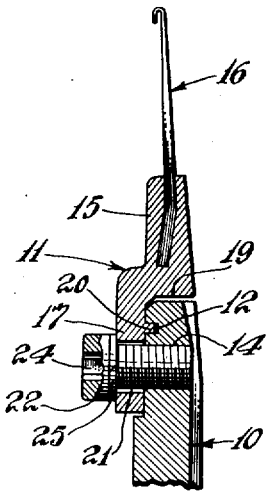
Figure 2 is a sectional view taken along the line 2—2 on Figure 1.
Figure 3:
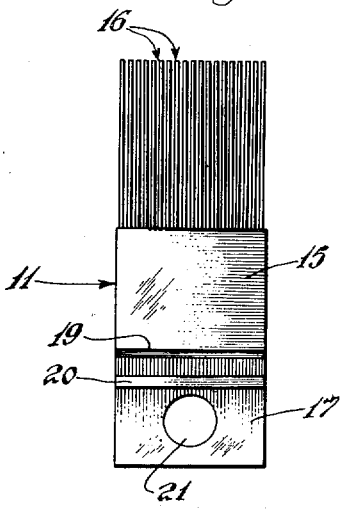
Figure 3 is a rear elevational view of a needle block.

As shown in Figures 2 and 3, the needle blocks 11 each have an upper section 15 in which the shanks of the needles 16 are embedded, a lower section 17 of reduced thickness adapted to engage the front of the needle bar, and a shoulder 19 adapted to overlie the upper edge of the bar. The rear surface of the blocks engaging the front of the bar has a lengthwise extending projection, rib, tongue or bead 20 extending into and cooperating with the groove 12 to mount and retain the block in a predetermined position with respect to the bar. An aperture 21 is provided in the blocks below the rib 20 adapted to register with an aperture 14 of the bar when the blocks are positioned thereon.

The blocks 11 are each adapted to be removably secured to the bar 10 by a screw 22 extending through the aperture 21 in the blocks and threaded into an aperture 14 of the bar. The screws may be of the type having a wrench receiving recess 24 in the head thereof. A lock washer 25 may be disposed between the head and the front of the block.

In assembling the needle blocks, the blocks are positioned against the bar with the ribs 20 seated in the groove 12. The screws 22 are then applied to secure the blocks on the bar. By reason of the interlocking rib and groove arrangement, the blocks are retained in their desired position, and, when subjected to severe forces during the knitting operation, any tendency to shift is prevented. This prevents the screws 22 from enlarging the apertures 21 and subsequent improper positioning of the blocks with respect to the bar, thereby eliminating the necessity of frequent adjustment of the blocks.

While the present invention has been described and illustrated by way of example with the groove 12 in the bar and the rib 20 on the blocks, it will be understood that the bar could be provided with a rib and the blocks with a groove.

From the foregoing description, it will be seen that the present invention provides an improved needle block and needle bar assembly which is simple in construction and can be manufactured without any material increase in manufacturing costs. The interlocking elements are rugged in construction and can readily withstand such rough usage to which they normally may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A [needle] bar assembly for warp knitting machines comprising, a [needle] bar member having a free edge surface and having an aperture extending transversely therethrough adjacent said surface, a [needle] block member having a shoulder surface adapted to be positioned adjacent said edge surface and having an aperture extending transversely therethrough adjacent said shoulder surface adapted to register with said [needle] bar member aperture, one of said members having an elongate rib thereon between its said aperture and its said surface and the other of said members having an elongate groove thereon between its said aperture and its said surface for receiving said rib, and means extending through said apertures for securing said [needle] block member to said [needle] bar member.

2. In a knitting machine, a [needle] bar having a free edge, a threaded aperture extending transversely therethrough adjacent said edge, and a lengthwise extending narrow groove on one side thereof between said aperture and said edge; a [needle] block having a shoulder positioned adjacent said edge, an aperture extending transversely therethrough adjacent said shoulder adapted to register with said [needle] bar aperture, and a lengthwise extending narrow rib on one side thereof between said last mentioned aperture and said shoulder positioned in said groove; and a screw extending through said [needle] block aperture and threadedly secured in said [needle] bar aperture to secure said [needle] block to said [needle] bar.

HAROLD C. NOE.

REFERENCES CITED

The following references are of record in the file of this patent or the original patent:

UNITED STATES PATENTS

| Number | Name | Date |
|---|---|---|
| 466,555 | Campion | Jan. 5, 1892 |
| 793,556 | Wilson et al. | June 27, 1905 |
| 834,598 | Wiener | Oct. 30, 1906 |
| 1,436,529 | Preston | Nov. 21, 1922 |
| 2,113,788 | Hirsch | Apr. 12, 1938 |
| 2,247,303 | Lieberknecht | June 24, 1941 |
| 2,254,201 | Anderson | Sept. 2, 1941 |
| 2,259,655 | Morton | Oct. 21, 1941 |
| 2,300,804 | Peel et al. | Nov. 3, 1942 |